(12) United States Patent
Gupta et al.

(10) Patent No.: US 6,766,176 B1
(45) Date of Patent: Jul. 20, 2004

(54) METHOD AND APPARATUS FOR AUTOMATICALLY ADJUSTING SPEAKER AND MICROPHONE GAINS WITHIN A MOBILE TELEPHONE

(75) Inventors: Samir Gupta, San Diego, CA (US); Anthony P. Mauro, San Diego, CA (US); Andrew P. Dejaco, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/281,568

(22) Filed: Mar. 30, 1999

Related U.S. Application Data

(63) Continuation-in-part of application No. 08/686,133, filed on Jul. 23, 1996.

(51) Int. Cl.$^7$ ................................................. H04M 1/00
(52) U.S. Cl. ............................... 455/550.1; 455/414.1; 455/67.11; 455/219
(58) Field of Search .................................. 455/550, 219, 455/220, 221, 222, 63.1, 414.1, 414.4, 501, 504, 505, 506, 67.11, 67.12, 67.13; 381/71.1, 71.14, 111–115

(56) References Cited

U.S. PATENT DOCUMENTS

| | | | |
|---|---|---|---|
| 3,889,059 A | | 6/1975 | Thompson et al. ............. 179/1 |
| 4,499,578 A | * | 2/1985 | Marouf et al. ................. 370/62 |
| 4,658,425 A | * | 4/1987 | Julstrom ...................... 379/206 |
| 4,715,063 A | | 12/1987 | Haddad et al. .............. 379/390 |
| 4,796,287 A | * | 1/1989 | Reesor et al. ................ 379/390 |
| 4,829,565 A | | 5/1989 | Goldberg ..................... 379/390 |
| 4,908,855 A | * | 3/1990 | Ohga et al. ............. 379/392.01 |
| 5,046,101 A | * | 9/1991 | Lovejoy ....................... 381/57 |
| 5,414,796 A | | 5/1995 | Jacobs et al. ................ 395/2.3 |
| 5,509,081 A | * | 4/1996 | Kuusuma ..................... 381/103 |
| 5,557,237 A | * | 9/1996 | Carpentier ................... 330/129 |

FOREIGN PATENT DOCUMENTS

| | | |
|---|---|---|
| DE | 3426815 | 8/1985 |
| EP | 0495360 | 7/1992 |
| EP | 0507482 | 10/1992 |
| WO | 8701255 | 2/1987 |

\* cited by examiner

*Primary Examiner*—Tony T. Nguyen
(74) *Attorney, Agent, or Firm*—Philip R. Wadsworth; Charles D. Brown; George C. Pappas

(57) ABSTRACT

The mobile telephone is provided with the capability for automatically adjusting the gain of a microphone of the telephone based upon the detected noise level in which the cellular telephone is operated. As the noise level increases, the gain of the microphone is automatically decreased, thereby compensating for the natural tendency of telephone users to speak more loudly in noisy environments. Also, by decreasing the microphone gain, any clipping that might otherwise occur as a result of the user speaking more loudly is avoided and the signal-to-noise ratio is not thereby decreased. Furthermore, because the microphone gain decreases, the volume level of the voice of the user as it is output from the other party's telephone is not unduly loud. Hence, the other party need not manually decrease the speaker gain of his or her telephone. In the exemplary embodiment, the cellular telephone includes a digital signal processor configured or programmed to apply the detected noise level to look-up tables relating various noise levels to appropriate speaker and microphone gain levels. Also, in the exemplary embodiment, the mobile telephone includes a speaker and the gain of the speaker is adjusted to increase in response to an increase in the background noise level. A device for adjusting gain in a microphone of a wireless communications device includes adjustable digital gain logic coupled to the microphone and a limiter coupled to the adjustable digital gain logic. The limiter performs peak detection on a speech signal that is input to the microphone.

44 Claims, 8 Drawing Sheets

METHOD AND APPARATUS FOR AUTOMATICALLY ADJUSTING SPEAKER AND MICROPHONE GAINS WITHIN A MOBILE TELEPHONE

CROSS-REFERENCE TO RELATED APPLICATION

This is a continuation-in-part of U.S. application Ser. No. 08/686,133, filed Jul. 23, 1996.

BACKGROUND OF THE INVENTION

I. Field of the Invention

The present invention generally relates to mobile telephones and in particular to the audio microphone and speaker of a mobile telephone.

II. Background

Cellular telephones and other mobile telephones are commonly employed within a wide range of differing noise environments. For example, a cellular telephone may be employed within a relatively quiet office or home environment or within a relatively noisy manufacturing or traffic environment.

In a noisy environment, a user tends to speak more loudly into the microphone of the cellular telephone than in relatively quiet environments. This is a natural tendency arising from the assumption by the user that he or she must speak more loudly to be heard over the noise. Yet such is often not necessary and, indeed, may be counterproductive. The microphone of the cellular telephone may be highly directional and therefore will not detect and amplify all of the noise that the user hears. Hence, it is unnecessary for the user to speak more loudly. Moreover, the cellular telephone may be capable of processing only a limited dynamic range of sound levels such that the voice of the user becomes clipped if the user speaks too loudly into the microphone. Such clipping can result in a decrease in the signal-to-noise ratio (SNR) between the transmitted voice and the transmitted background noise level. Hence, speaking loudly into the microphone may actually make it more difficult for the listener to distinguish the voice of the user.

The clipping phenomenon described above is illustrated in FIGS. 1–2. More specifically, FIG. 1 illustrates a voice signal 10 and a background noise signal 12 input to a cellular telephone. The background noise level increases beginning at time 14. In response thereto, the user speaks more loudly, resulting in an increase in the input voice signal level. As the noise level continues to rise, the user speaks even more loudly until reaching a point 16 where clipping begins. Thereafter, the voice is clipped, yielding a lower SNR as well as a possibly distorted voice signal. FIG. 2 illustrates the resulting changes in the SNR. As can be seen, the SNR decreases following time 16.

Hence, in circumstances where clipping occurs, a user who tries to speak more loudly can actually reduce intelligibility. Even if clipping does not occur, the user speaking more loudly may cause annoyance to the listener, perhaps resulting in a need for the listener to decrease the volume of the speaker of his or her telephone. For many telephones, particularly non-mobile telephones, the volume of the speaker cannot be adjusted and hence the listener may not be able to achieve a comfortable volume level. Moreover, privacy may be jeopardized at the listener's end if the voice of the user is too loud and the listener cannot decrease the speaker volume level.

Another problem arising from high noise levels is that it may be difficult for the user in the noisy environment to hear the voice of the other party. For many cellular telephones, the volume or gain of the speaker of the telephone can be manually increased to compensate, but such manual action by the user is inconvenient. Moreover, manual action may be dangerous, particularly if the user is driving in traffic while attempting to manually decrease the speaker gain.

Additionally, some users speak relatively softly, while other users speak relatively loudly. It is inherently difficult to design microphone gains to provide adequate gain for soft talkers without saturating loud talkers.

Accordingly, there is a need to remedy the foregoing problems, and it is to that end that the invention is primarily drawn.

SUMMARY OF THE INVENTION

The foregoing problems are addressed by providing a cellular telephone, or other mobile telephone, with a means for adjusting the gain of a microphone of the telephone based upon the detected noise level in which the cellular telephone is operated. As the noise level increases, the gain of the microphone is automatically decreased, thereby compensating for the tendency of telephone users to speak more loudly in noisy environments. Also, by decreasing the microphone gain, any clipping that might otherwise occur as a result of the user speaking more loudly is avoided and the SNR is thereby not decreased. Furthermore, because the microphone gain decreases, the volume level of the voice of the user as it is output from the telephone of the other party to the telephone call is not unduly loud. Hence, the other party need not manually decrease the speaker gain of his or her telephone.

In an exemplary embodiment, automatic microphone gain adjustment is achieved by providing the cellular telephone with a means for detecting the background noise level of the environment in which the mobile telephone is operating and a means for setting the gain of a microphone of the mobile telephone based upon the detected background noise levels. The means for setting the gain of the microphone operates to decrease the gain in response to an increase in background noise by an amount inversely proportional to the background noise level. In the exemplary embodiment, the microphone gain is reduced by half the value of the increase in background noise measured in decibels.

In the exemplary embodiment, the mobile telephone further includes a means for automatically setting the gain of a speaker of the mobiles telephone based upon the background noise level. More specifically, the means for setting the gain of the speaker operates to increase the gain in response to an increase in the background noise level. Hence, the user need not manually increase the speaker gain if the background noise level increases.

The invention is particularly well suited for use in cellular telephones employing digital signal processing (DSP) units. Many such cellular telephones include hardware or software within the DSP for calculating the background noise level from the input signal for the purposes of performing noise reduction. An exemplary embodiment for calculating the background noise level is described in detail in U.S. Pat. No. 5,414,796, entitled "Variable Rate Vocoder," which is assigned to the assignee of the present invention and incorporated by reference herein. With such cellular telephones, the DSP is merely reconfigured or reprogrammed to apply the detected noise level to look-up tables relating various noise levels to appropriate speaker and microphone gain levels. A wide variety of other implementations are also possible.

In one aspect of the invention, a device for adjusting gain in a microphone of a communications device advantageously includes adjustable digital gain logic coupled to the microphone; and a limiter coupled to the adjustable digital gain logic, the limiter being configured to perform peak detection on a speech signal that is input to the microphone.

In another aspect of the invention, a method of adjusting gain in a microphone of a communications device advantageously includes the steps of applying a digital gain to a signal that is input into the microphone; and limiting the digital gain.

In another aspect of the invention, a device for adjusting gain in a microphone of a communications device advantageously includes means for applying a digital gain to a signal that is input into the microphone; and means for limiting the digital gain, the means for limiting being configured to perform peak detection on the signal.

Thus, with the invention, the above-described problems occurring when cellular telephones or other mobile telephones are used in environments having high background noise levels are substantially overcome. An advantage of the present invention is that the need for a volume control button on a telephone is eliminated. Other advantages of the invention, as well as other features and objects of the invention, will be apparent from the detailed description which follows and from the accompanying drawings.

BRIEF DESCRIPTION OF THE DRAWINGS

The features, objects, and advantages of the present invention will become more apparent from the detailed description set forth below when taken in conjunction with the drawings in which like; reference characters identify correspondingly throughout and wherein.

DETAILED DESCRIPTION OF THE PREFERRED EMBODIMENTS

With reference to the remaining figures, exemplary embodiments of the invention will now be described. The exemplary embodiments will primarily be described with reference to block diagrams illustrating apparatus elements. Depending upon the implementation, each apparatus element, or portions thereof, may be configured in hardware, software, firmware or combinations thereof. It should be appreciated that not all components necessary for a complete implementation of a practical system are illustrated or described in detail. Rather, only those components necessary for a thorough understanding of the invention are illustrated and described.

Figure 1:
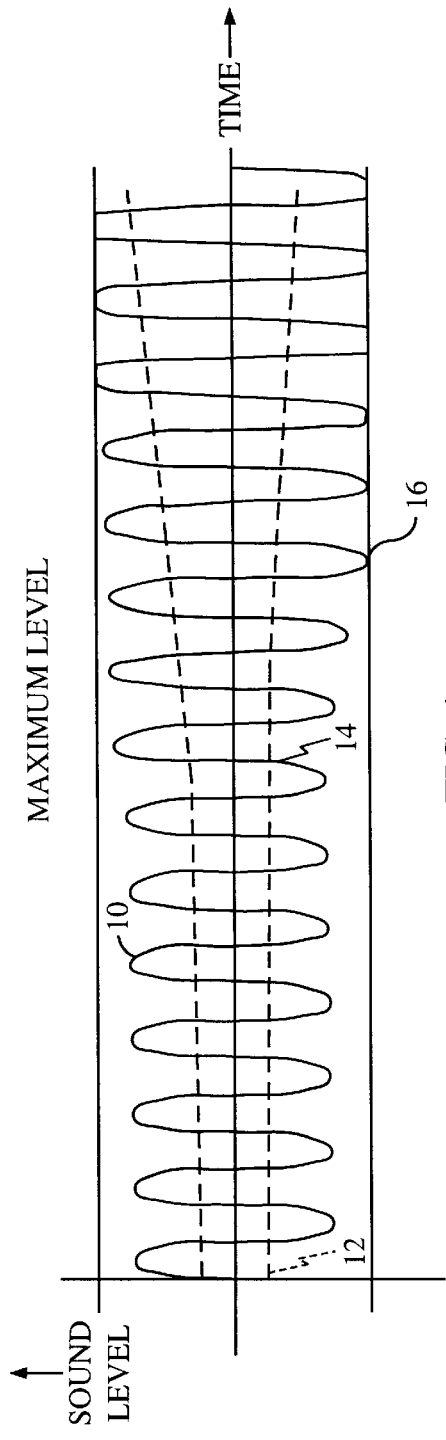
FIG. 1 is a graph illustrating background noise levels and corresponding input voice levels for a cellular telephone operating in a changing noise environment.
Figure 2:
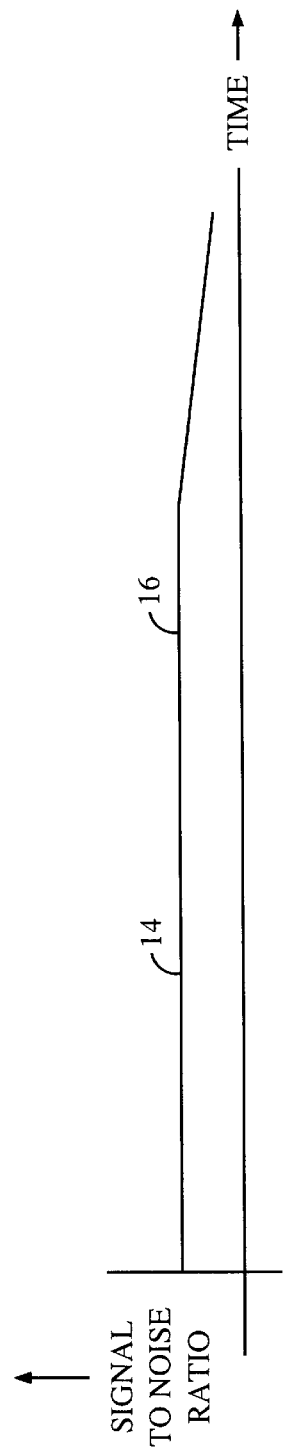
FIG. 2 is a graph illustrating the signal to noise level for the input voice and noise signals of FIG. 1.
Figure 3:
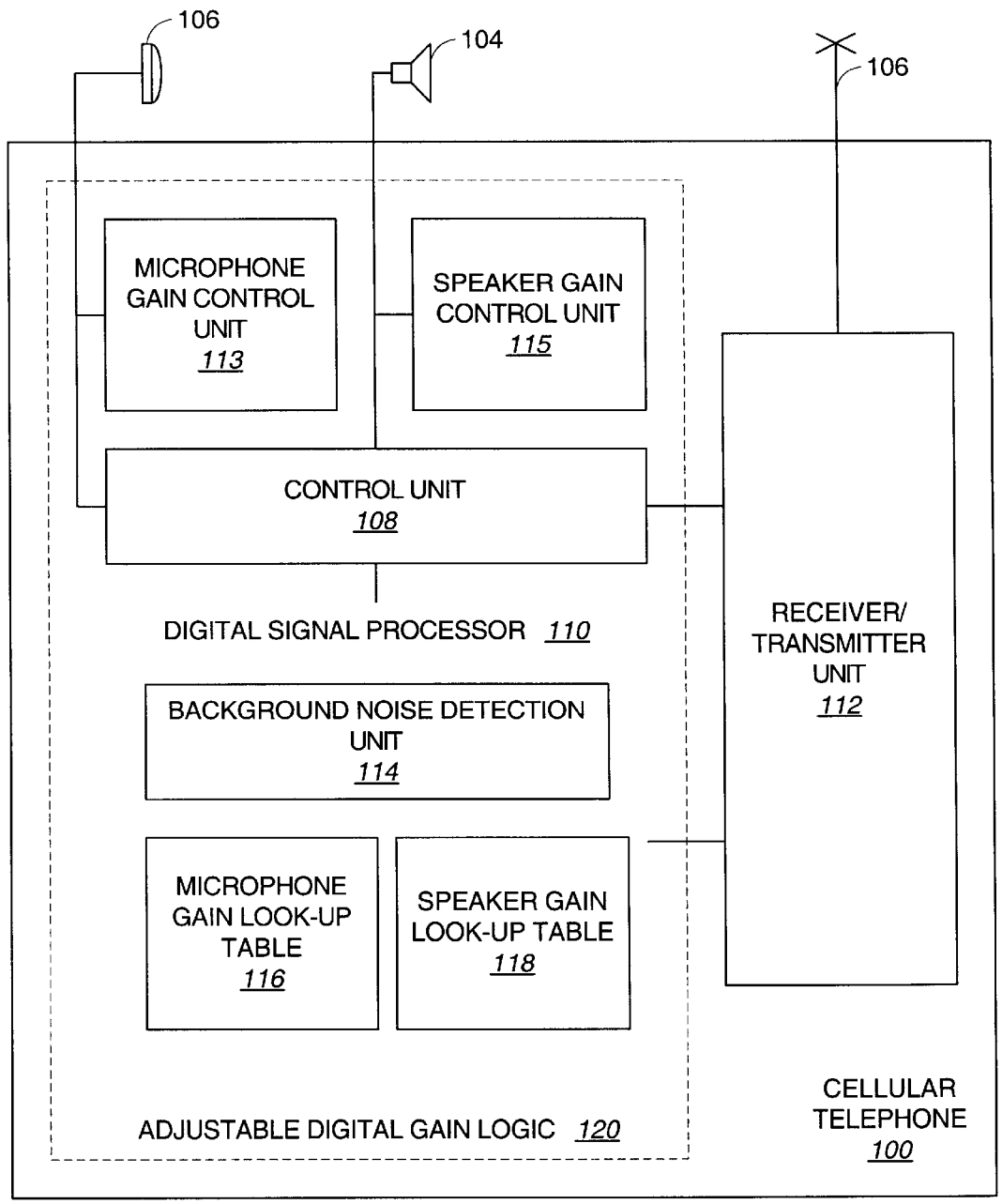
FIG. 3 is a block diagram of a cellular telephone configured in accordance an embodiment of the invention.

FIG. 3 illustrates a cellular telephone 100 having a microphone 102, a speaker 104 and an antenna 106. Pertinent internal components of the telephone illustrated in FIG. 3 include a control unit 108, a Digital Signal Processor (DSP) 110, and a receiver/transmitter unit 112. Also, included are a microphone gain control unit 113 and a speaker gain control unit 115.

In use, a user of cellular telephone 100 speaks into microphone 102 and his or her voice and any detected background noise are routed by control unit 108 into DSP 110 for processing therein. In the exemplary embodiment, the processed voice signals are encoded, by units not separately shown, using the cellular transmission protocol of Code Division Multiple Access (CDMA), as described in detail in the Telecommunication Industry Association's TIA/EIA/IS-95-A Mobile Station-Base Station Compatibility Standard for Dual-Mode Wideband Spread Spectrum Cellular System. The encoded signals are routed to receiver/transmitter 112, then transmitted via antenna 106 to a local base station (not shown). The signals may be forwarded from there to a remote telephone which may be another cellular telephone, other mobile phone or a land-line connected to a Public Switched Telephone Network (PSTN) (not shown). Voice signals transmitted to cellular phone 100 are received via antenna 106 and receiver/transmitter 112, processed by DSP 110 and output through the speaker, all under the control of the control unit 108.

The DSP 110 may, depending upon the implementation, perform any of a variety of conventional digital processing functions on the voice signals. Additionally, DSP 110 determines the background noise level of the local environment from the signals detected by microphone 102 and sets the gain of microphone 102 to a level selected to compensate for the natural tendency of the user of cellular telephone 100 to speak more loudly in noisy environments. In the exemplary embodiment, the microphone gain is set to a level that is generally inversely proportional to the background noise level. In the exemplary embodiment, the microphone gain is decreased by half the increase in background noise measured in decibels.

To this end, DSP 110 includes background noise level detection unit 114, microphone gain look-up table 116 and speaker gain look-up table 118. Background noise level detector 114 determines, in accordance with conventional techniques, the background noise level from signals received from microphone 102, yielding a digital value representative of the background noise level. The digital value may, for example, represent the background noise energy in decibels. DSP 110 applies the digital value to microphone gain look-up table 116 to read out a microphone gain value for applying to microphone 102 via microphone gain control unit 113.

The gain of a microphone 106 may be adjusted via digital logic, such as described with respect to DSP 110, for example. An example embodiment of this digital logic is depicted by the dashed rectangle identifying adjustable digital gain logic 120 in FIG. 3.

In the exemplary embodiment, the background noise level B' is determined in the current frame based on the previous frame background noise level B and the current frame energy $E_f$. In determining the new background noise level B' for use during the next frame (as the previous frame background noise estimate B), two values are computed. The first value $V_1$ is simply the current frame energy $E_f$. The second value $V_2$ is the larger of B+1 and K·B, where K=1.00547. The smaller of the two values $V_1$ or $V_2$ is chosen as the new background noise level B'.

Mathematically, $$V_1 = R(0) \quad (1)$$

$$V_2 = \min(160000, \max(K \cdot B, B+1)) \quad (2)$$

and the new background noise level B' is:

$$B' = \min(V_1, V_2) \quad (3)$$

where min (x,y) is the minimum of x and y, and max (x,y) is the maximum of x and y.

Figure 4:
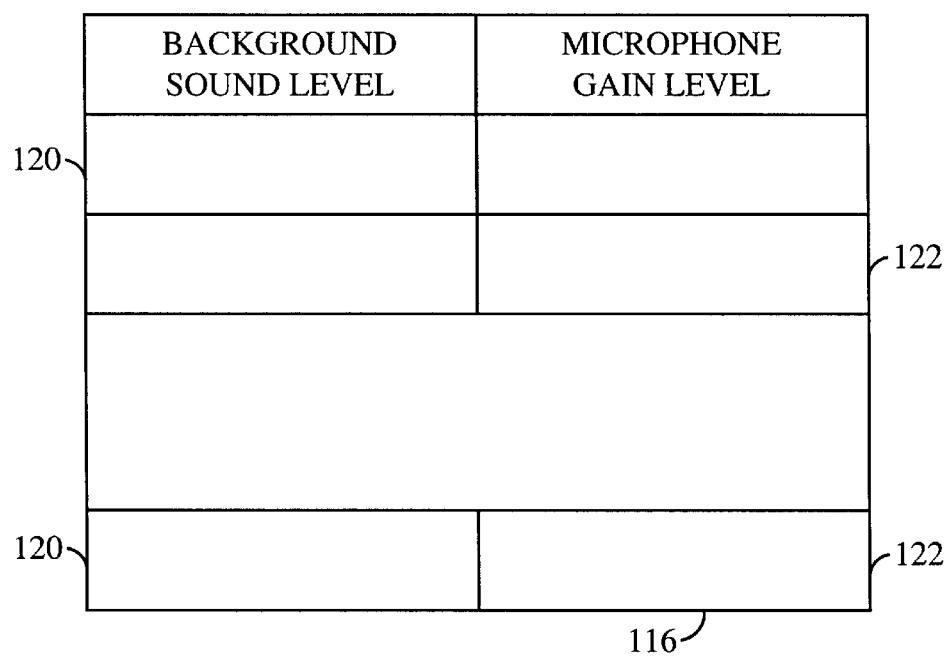
FIG. 4 is a block diagram of a microphone gain look-up table of the cellular telephone of FIG. 3.

FIG. 4 illustrates an exemplary microphone gain look-up table 116 having entries 120 for various background noise levels and entries 122 for corresponding microphone gain values. The microphone gain values may, for example, be digital representations of voltage or current levels for applying to an amplifier of microphone 102 (not shown). Entries 120 may specify individual noise levels or ranges of noise levels. Every expected quantized input noise level is represented within the look-up table 116. If a noise level is detected that does not have a corresponding entry in the table 116, a default value is employed. In accordance with conventional techniques, look-up table 116 may be implemented as a portion of read only memory (ROM). In other implementations, look-up table 116 may be implemented using other appropriate techniques, such as software algorithms.

As noted, the background noise level value read out from microphone gain look-up table 116 is applied to microphone 102 to adjust its gain. By storing values in look-up table 116 that provide a microphone gain that is decreased with increasing noise levels, the natural tendency of a telephone user to speak more loudly in a noisy environment is automatically compensated. Also, by decreasing the microphone gain, a loss in SNR caused by signal clipping, in microphone 102 itself or in DSP 110, is avoided.

The background noise levels may be calculated and corresponding gain levels read out and applied to microphone 102 either continuously or periodically. In the exemplary embodiment, the microphone gain is readjusted every two or three seconds, thereby accommodating for the typical delay between an increase in the background noise level and a corresponding increase in the loudness of the voice of the user. In an alternative embodiment, the noise level is detected and the gain set only once per call or perhaps only at power-up of the cellular telephone.

Figure 5:
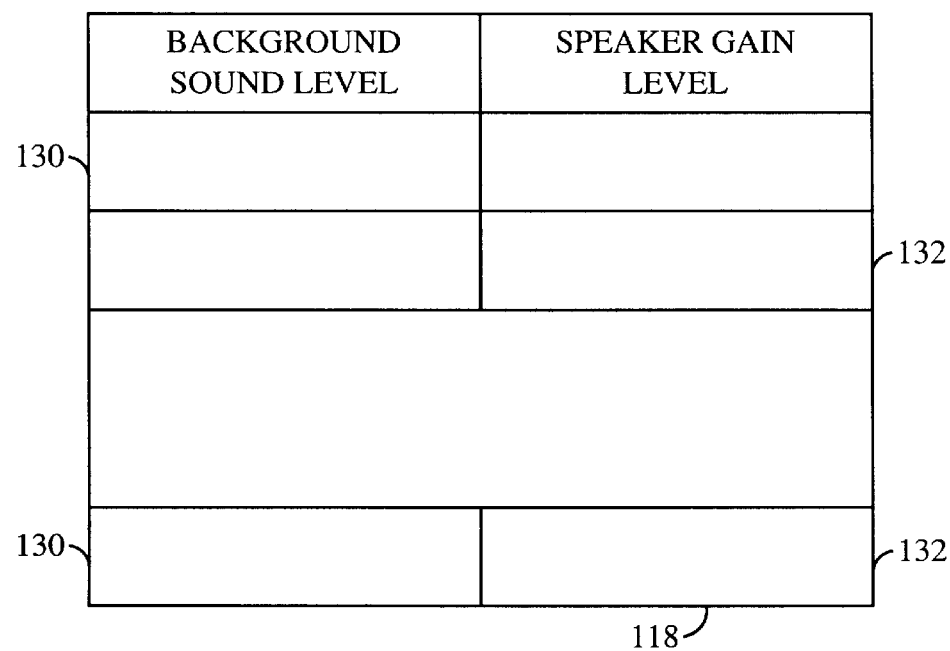
FIG. 5 is a block diagram of a speaker gain look-up table of the cellular telephone of FIG. 3.

In the present invention the gain of speaker 104 is automatically adjusted in a manner similar to the microphone gain. The background noise level value calculated by background noise level detection unit 114 is applied to speaker gain look-up table 118 to read out a speaker gain value appropriate for the background noise level. An exemplary speaker gain look-up table 118 is illustrated in FIG. 5. Speaker gain look-up table 118 has entries 130 for background noise levels and entries 132 for corresponding speaker gain values. The speaker gain values may represent voltage or current levels for controlling the gain of an amplifier (not separately shown) of the speaker. A default value may be employed for any noise levels not having an entry in speaker gain look-up table 118. Also, as with microphone gain look-up table 116, the speaker gain look-up table 118 may be accessed continuously or periodically, or perhaps only once per call or only at power-up.

However, unlike microphone gain look-up table 116 which is advantageously programmed with values selected to decrease the gain with increasing noise levels, speaker gain look-up table 118 is advantageously programmed with values selected to increase gain with increasing noise levels. The speaker gain values may, for example, be set to increase gain by an amount substantially proportional to an increase in background noise levels. As such, the user need not adjust the speaker gain by a manual control unit (not shown). Rather, automatic adjustment is performed.

What has been described are exemplary embodiments of a cellular telephone configured to automatically decrease microphone gain and increase speaker gain in response to an increase in background noise levels of the environment of the cellular telephone. In the exemplary embodiments, the decrease in microphone gain and the increase in speaker gain are both proportional to an increase in background noise levels. In other embodiments, other relationships between the microphone and speaker gains and the background noise levels are envisioned. In general, any desired relationship may be employed merely by pre-programming the look-up tables with appropriate values. The values may, for example, be initially calculated based upon a mathematical relationship such as simple proportionality. In other cases, appropriate values may be determined empirically by measuring the extent to which an actual telephone user increases his or her speaking volume in response to changes in background noise levels. As can be appreciated, a wide range of possible techniques for determining the appropriate values for storing in the look-up tables may be employed consistent with the general principles of the invention. Furthermore, look-up tables are not necessary. Any suitable means for adjusting the microphone and speaker gains may be employed. For example, the detected noise level digital value may be converted to an analog voltage, processed by circuitry to scale and invert if necessary, then applied directly to respective amplifiers of the microphone and speaker for adjusting the gain.

Figure 6:
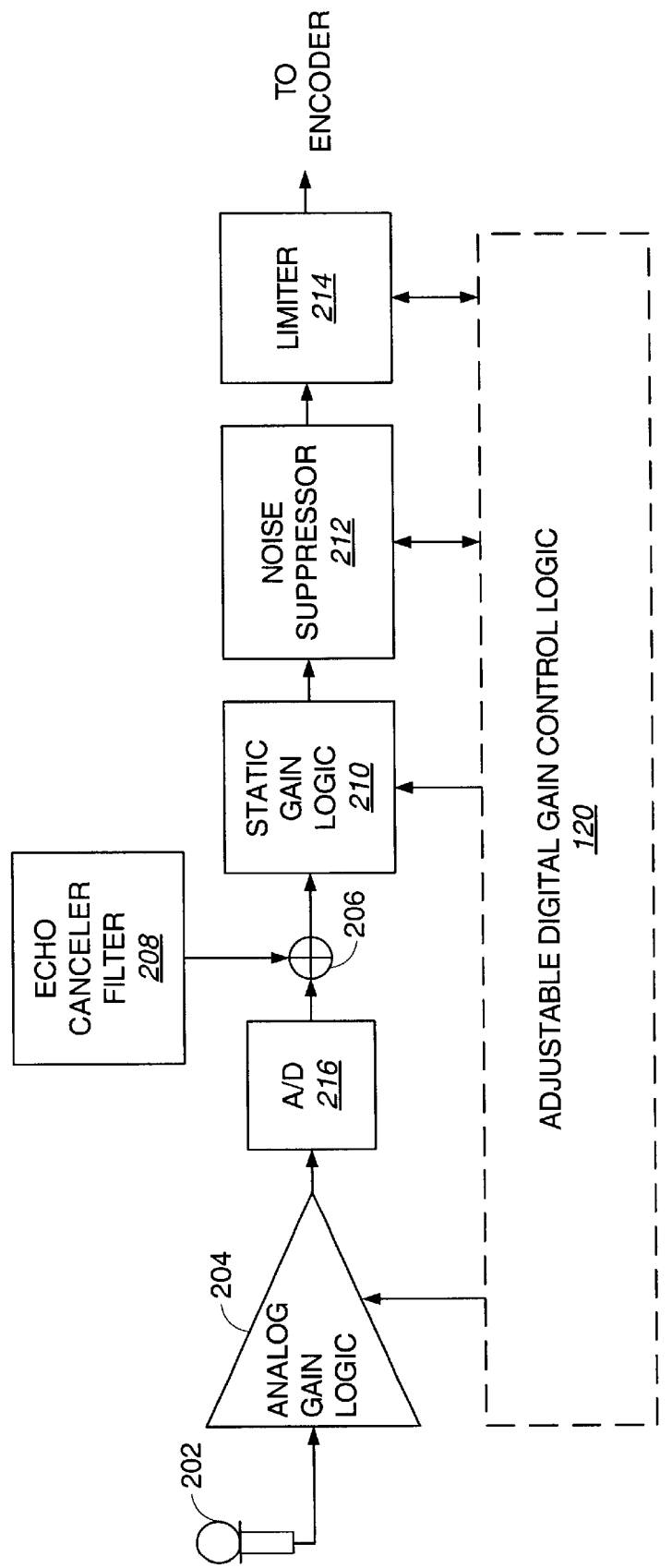
FIG. 6 is a block diagram of reverse-link circuitry for a telephone.

In accordance with one embodiment, a limiter may be added to conventional reverse-link circuitry for a telephone. As shown in FIG. 6, reverse-link circuitry 200 for a telephone (not shown) includes a microphone 202, analog gain logic 204 (typically a conventional operational amplifier), an adder/subtractor 206, an echo canceler filter 208, static gain logic 210, a noise suppressor 212, a limiter 214, and an analog-to-digital converter (A/D) 216.

A user speaks into the microphone 202, which transduces the sonic speech signal into an electric speech signal. The speech signal is provided to the analog gain logic 204, which applies an analog gain to the speech signal. The speech signal is then provided to the A/D 216, which samples and quantizes the analog speech signal, converting the signal to a digital format in accordance with any of a number of known techniques including, e.g., pulse-coded modulation (PCM), µ-law, or A-law. A signal generated by the echo canceler filter 208 is subtracted from the digitized speech signal by the adder/subtractor 206, thereby eliminating echo components from the speech signal. The adder/subtractor 206, the A/D 216, and the echo canceler filter 208 are advantageously conventional components that are well known in the relevant art.

The filtered speech signal is provided to the static gain logic 210, which applies a static digital input gain to fine tune the amplification of the speech signal. Devices to implement the static gain logic 210 are well known in the art.

The static gain is advantageously be chosen in conjunction with a limiter threshold to compensate for reduction in analog gain. The limiter 214, which is advantageously configured to operate on every spoken word, serves to prevent clipping in speech signals that are maximized, such as, e.g., words spoken by loud-talking users.

The amplified speech signal is provided to the noise suppressor 212, which suppresses background noise components of the speech signal, which were received into the microphone 202 as the user spoke. Devices to implement the noise suppressor 212 are well known in the art. In one embodiment the noise suppressor 212 is not used. In another embodiment the A/D 216, the echo canceler filter 208, the adder/subtractor 206, the static gain logic 210, the noise suppressor 212, and the limiter 214 are all implemented in a digital signal processor (DSP). In the embodiment illustrated in FIG. 6, the signal is provided to the limiter 214 by the noise suppressor 212. The limiter 214 serves to prevent clipping in the speech signal if the speech signal is maximized, as described below. The limiter 214 generates an output signal that is provided to an encoder (not shown) before being modulated and transmitted over a digital communications channel.

As shown in FIG. 6, in an example embodiment, adjustable digital gain control logic may be coupled with, and/or alternatively comprised of, one or more of the limiter 214, the noise suppressor 212, static gain logic 210, and analog gain logic 204. As such, adjustable digital gain logic 120 may be coupled with microphone 202 for adjusting its gain.

Figure 7:
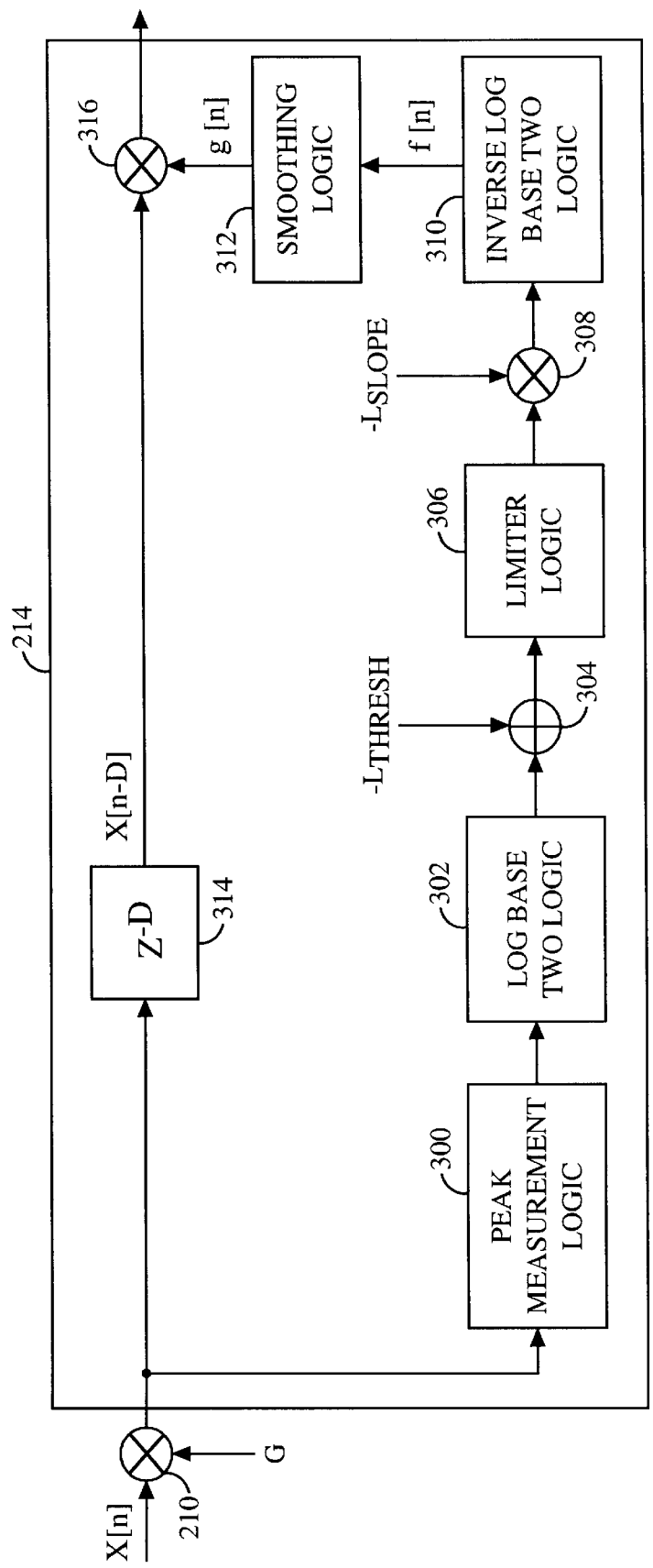
FIG. 7 is a block diagram of a limiter that may be used in the reverse-link circuitry of FIG. 6.

A limiter 214 that is configured in accordance with one embodiment is illustrated in greater detail in FIG. 7. The limiter 214 includes peak measurement logic 300, log base two logic 302, an adder/subtractor 304, limiter logic 306, a first multiplier 308, inverse log base two logic 310, smoothing logic 312, a delay element 314, and a second multiplier 316.

Digitized speech samples x[n] are multiplied by a static input gain G by static gain logic 210, which is advantageously a conventional multiplier 210. The digital gain G serves to fine tune, or adjust, the amplification levels of the speech samples x[n]. The speech samples x[n] are then provided to the limiter 214, which is advantageously implemented in a DSP. In the limiter 214, the input speech samples x[n] are provided to the peak measurement logic 300 and to the delay element 314.

The peak measurement logic 300 implements the following equation to measure the peak of the speech samples x[n]:

$$x_{peak}[n]=(1-RT)x_{peak}[n-1]+ATx_{diff}[n].$$

In the above equation, the peak value of speech sample x[n] is set equal to the quantity one minus the release time RT multiplied by the peak value of the prior sample x[n−1], added to the product of the attack time and a difference value $x_{diff}[n]$. The difference value $x_{diff}[n]$ is set equal to the difference between the absolute value of the current speech sample and the peak value of the prior speech sample, if and only if this difference is greater than zero. Otherwise, the difference value $x_{diff}[n]$ is set equal to zero.

The computed peak value $x_{peak}[n]$ is provided to the log base two logic 302, which calculates the base-2 logarithm of the peak value $x_{peak}[n]$, generating an output signal in units of decibels (dB). The dB signal is provided to the adder/subtractor 304, which subtracts a limiting threshold value $L_{thresh}$ from the dB signal. A resultant dB signal is provided to the limiter logic 306, which performs a limiting function on the signal. The signal is then provided to the first multiplier 308, which multiplies the signal by an attenuating (negative) slope value $-L_{slope}$. The adder/subtractor 304, the limiter logic 306, and the first multiplier 308 serve to generate an ouput dB value that is equal to the input dB value, provided the input dB value (and the output dB value) are less than or equal to the limiting threshold value $L_{thresh}$. When the input dB value exceeds the limiting threshold value $L_{thresh}$, the slope of the output signal is attenuated, or scaled, in accordance with the slope value $-L_{slope}$ such that, e.g., the output dB value is increased by one dB if the input dB value rises by twenty dB. The limiting threshold value $L_{thresh}$ may advantageously be chosen to be very close to the original saturation point of the static gain logic amplifier 210 prior to digital fine tuning for saturation reduction. The original saturation point is defined by the desired transmit gain of the microphone system as implemented in the analog domain.

The first multiplier 308 provides the output dB signal to the inverse log base two logic 310, which calculates the inverse base-2 logarithm of the dB signal by raising the value two to the exponential power of the dB signal value (G, in dB). The inverse log base two logic 310 generates an output signal f[n]. The signal f[n] is provided to the smoothing logic 312, which generates a smoothed output signal g[n] in accordance with the following equation:

$$g[n]=(1-k)g[n-1]+kf[n],$$

where the value k is a smoothing coefficient that is advantageously chosen for optimal audio quality.

The smoothed signal g[n] is provided to the second multiplier 316. The delay element 314, which receives the input speech samples x[n], is configured to delay each speech sample x[n] by a time D, generating delayed output speech samples x[n−D]. The delayed speech samples x[n−D] are provided to the second multiplier 316. The second multiplier 316 multiplies the delayed speech samples x[n−D] by the smoothing function g[n], generating a limited output signal for provision to an encoder (not shown) before being modulated and transmitted over a digital communications channel.

The limiter 214 thus limits signal levels to a value of roughly $L_{thresh}$ in magnitude. To provide adequate gain for soft talkers without saturating loud talkers, the front-end analog gain is reduced by a fixed dB amount and compensated for with digital gain G where additional headroom is available. The limiter 214 then reduces loud levels back to the full range of the A/D 216 (FIG. 6) on the other side of the digital communications channel, while giving soft talkers adequate signal-to-quantization noise levels. The various mathematical calculations may be performed in accordance with known DSP techniques. Thus, the limiter 214 advantageously provides the capacity to widen the perceived input dynamic range while avoiding saturation for loud signals. Other variations in input signal levels that may be compensated for in accordance with the above-described embodiment include, e.g., hands-free car kit versus telephone and lapel microphone versus mouthpiece microphone.

It would be understood by those of skill in the art that the embodiments described above directed to reverse-link circuitry may reside in any communications device spoken into by a user. Similarly, those of skill would appreciate that the embodiments described below directed to forward-link circuitry may reside in any communications device that emits sound.

In accordance with one embodiment, conventional forward-link circuitry 400 for a telephone may be modified to adjust telephone speaker volume based on available headroom and background noise estimate. As shown in FIG.

8, forward-link circuitry for a telephone (not shown) includes output filters 402, fixed gain logic 404, a compressor 406, automatic volume control (AVC) logic 408, user volume setting logic 410, a digital-to-analog converter (D/A) 412, and a speaker 414.

For purposes of illustration, accompanying components of the reverse-link circuitry of FIG. 6 for the telephone are also depicted, including the microphone 202, the analog gain logic 204, the A/D 216, the echo canceler filter 208, the adder/subtractor 206, and the noise suppressor 212. The various reverse-link elements may function and be implemented as described above with reference to FIG. 6. In one embodiment the digital forward-link circuitry and the digital reverse-link circuitry are implemented in a DSP.

Figure 8:
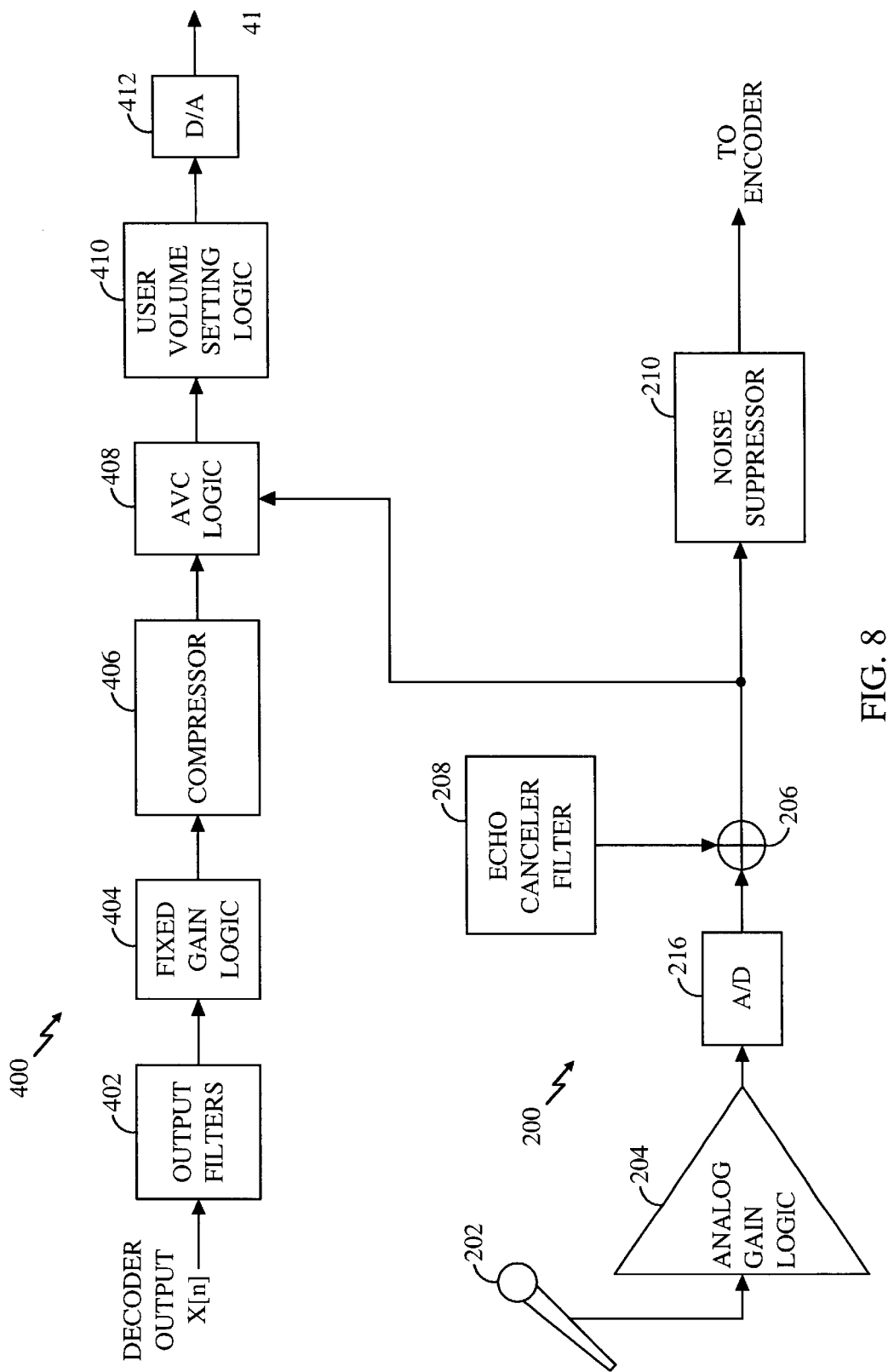
FIG. 8 is a block diagram of forward-link circuitry for a telephone.

In FIG. 8, digitized speech samples x[n] are received on a communication channel from another telephone and are decoded by a decoder (not shown). The speech samples x[n] are output from the decoder and provided to the output filters 402 for appropriate filtration as understood by those of skill in the art. The output filters 402 provide filtered speech samples to the fixed gain logic 404, which multiplies the speech samples by a fixed gain G, generating amplified speech samples. The amplified speech samples are provided to the compressor 406, which either compresses or expands the speech samples as described below with reference to FIG. 9.

The compressed speech samples are provided to the AVC logic 408. The AVC logic 408 is also coupled to the output of the adder/subtractor 206. The AVC logic 408 receives a periodically updated background noise estimate (BNE) signal from the adder/subtractor 206. The AVC logic 408 provides AVC based upon the available headroom (as obtained from the compressor 406) and the BNE (as obtained from the reverse-link circuitry prior to noise suppression). An exemplary AVC algorithm that may be performed by the AVC logic 408 is described below with reference to FIG. 10.

If the AVC logic 408 is in the OFF mode, volume control is specified by the user through a volume control button (not shown) on the telephone and the user volume setting logic 410. If the AVC logic 408 is ON, the AVC logic 408 automatically provides volume control in response to changing background noise levels and available headroom. In one embodiment the user may turn the AVC mode OFF or ON. For example, the user may set the speaker volume level manually a first time, and then turn on the AVC logic 408 to provide speaker volume control thereafter.

The AVC logic 408 generates a volume control signal, which is applied to the user volume setting logic 410. The user volume setting logic 410 provides the output digitized speech samples, at the appropriate volume level, to the D/A 412. The D/A 412 converts the output digitized speech samples to an analog signal and provides the analog signal to the speaker 414, which transduces the signal into an audible speaker output signal for the user.

Figure 9:
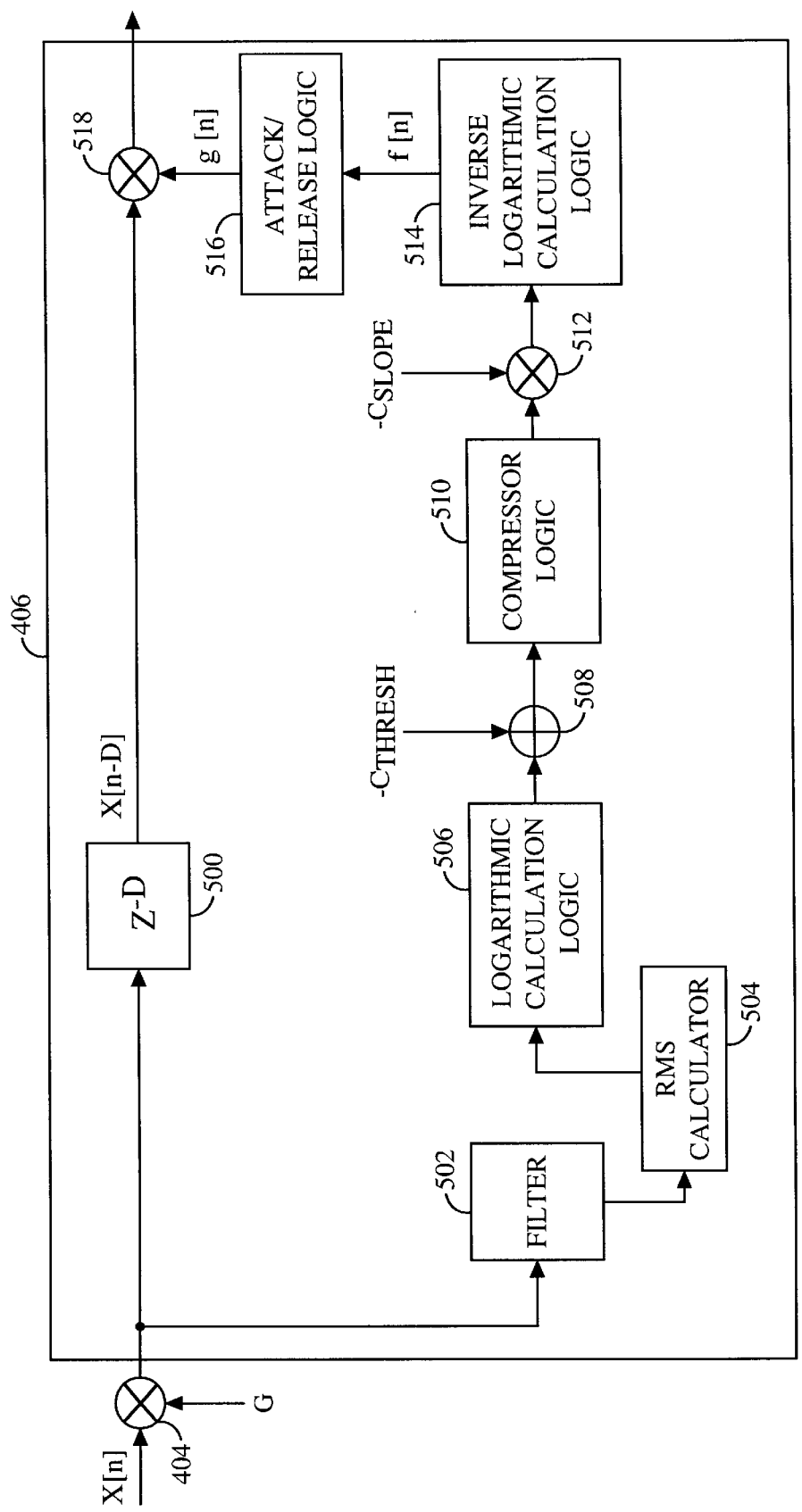
FIG. 9 is a block diagram of a compressor that may be used in the forward-link circuitry of FIG. 8.

In one embodiment a compressor 406 may be implemented to provide compression and expansion, as shown in FIG. 9. As illustrated in FIG. 9, the forward-link circuitry of a telephone (not shown) includes fixed gain logic 404, which is advantageously a conventional multiplier 404, and a compressor 406, which may be used as a compressor or an expander, as desired.

The compressor 406 includes a delay element 500, a filter 502, a root mean square (RMS) calculator 504, logarithmic calculation logic 506, an adder/subtractor 508, compressor logic 510, a first multiplier 512, inverse logarithmic calculation logic 514, attack/release time application logic 516, and a second multiplier 518. In an alternate embodiment, the filter 502 is not used.

Digitized speech samples x[n] are provided to the multiplier 404, which multiplies the speech samples x[n] by a digital gain G. The digital gain G is advantageously chosen, in conjunction with a compression threshold defined below, to ensure that the softest talker is brought up to the desired signal level, driving the compressor 406 during peaks. The speech samples x[n] are then provided to the compressor 406, which is advantageously implemented in a DSP. In the compressor 406, the input speech samples x[n] are provided to the filter 502 and to the delay element 500. The delay element 500, which may, e.g., be implemented with an output sample FIFO, serves to predictively control the output signal level, thereby attacking peaks ahead of transmission. The filter 502 may be configured to filter the speech samples in accordance with any of various known filtration techniques. For example, the filter 502 may be configured as a bandpass filter in order to selectively choose which frequencies to make compression decisions on. In one embodiment, in which the forward-link circuitry 400 resides in a hands-free car kit, the filter 502 serves to boost frequencies with heavy distortion going into the compressor 406. Any frequencies of the signal that have distortion levels exceeding a predefined threshold are boosted by the filter 502. The filtered speech samples are provided to the RMS calculator 504.

The RMS calculator 504 implements the following equation to calculate the RMS of the speech samples:

$$X_{rms}[n]=(1-TAV)x_{rms}[n-1]+TAVx^2[n].$$

In the above equation, the RMS value of speech sample x[n] is set equal to the quantity one minus a time-averaging coefficient TAV multiplied by the RMS value of the prior sample x[n−1], added to the product of the time-averaging coefficient TAV and the square of the current speech sample x[n]. The time-averaging coefficient TAV serves to determine the rate of RMS averaging. The RMS level of the speech samples is advantageously calculated using a first-order low-pass filter applied to the energy domain signal. The time constant for this smoothing filter is advantageously chosen so that the smallest frequency component of interest can achieve a constant RMS output for the given smoothing filter. By way of example, for a 100 Hz sinusoid, the time constant should be approximately 10 ms.

The computed RMS value $x_{rms}[n]$ is provided to the logarithmic calculation logic 506, which calculates the base-2 logarithm of the RMS value $x_{rms}[n]$ and multiplies the calculated base-2 logarithmic value by 0.5, generating an output signal in units of decibels (dB). The dB signal is provided to the adder/subtractor 508, which subtracts a compression threshold value $C_{thersh}$ from the dB signal. A resultant dB signal is provided to the compressor logic 510, which performs a compression function on the signal. The signal is then provided to the first multiplier 512, which multiplies the signal by an attenuating (negative) compression slope value $-C_{slope}$. If the RMS level of the signal rises above the value $C_{thresh}$, compression is applied to the signal (with appropriate attack and release times) based upon the value $C_{slope}$, which specifies a compressor ratio R as a ratio of dB in accordance with the following equation: $C_{slope}=1-1/R$. The compression ratio R may be defined as the RMS level above which all compression actually occurs. The compression threshold value $C_{thresh}$ and the compression slope value $C_{slope}$ for a particular signal path should be chosen in accordance with the average dBm0 talker level desired for normalization.

The first multiplier 512 provides the output dB signal to the inverse logarithmic calculation logic 514, which calculates the inverse base-2 logarithm of the dB signal by raising the value two to the exponential power of the dB signal value (G, in dB). The inverse logarithmic calculation logic 514 generates an output signal f[n]. The signal f[n] is provided to the attack/release time application logic 516, which generates an output signal g[n] in accordance with the following equation:

$$g[n]=(1-k)g[n-1]+kf[n],$$

where the value k is a smoothing coefficient that is advantageously chosen for optimal audio quality. The attack/release time application logic 516 advantageously serves a smoothing function. Attack and release are applied using a first-order smoothing function to provide a smooth gain curve for application to the output signal (the value k is advantageously changed depending upon whether is attack or release is being applied. The attack time may advantageously be set to one millisecond (ms) to attack peaks in the input samples quickly and accurately. The release time may advantageously be set to between 100 and 200 ms to keep quick gain fluctuations from affecting the quality of the compressor 406. In one embodiment a predictive delay of one ms is used to relax the attack time. In another embodiment attack and release are implemented with a hysteresis to prevent oscillations in the input signal from affecting the output gain curve.

The smoothed signal g[n] is provided to the second multiplier 518. The delay element 500, which receives the input speech samples x[n], is configured to delay each speech sample x[n] by a time D, generating delayed output speech samples x[n-D]. The delayed speech samples x[n-D] are provided to the second multiplier 518. The second multiplier 518 multiplies the delayed speech samples x[n-D] by the smoothing function g[n], generating a compressed output signal for provision to AVC logic 408 (FIG. 8).

The compressor logic 510 may also be used as expander logic by configuring the adder/subtractor 508 to subtract the dB signal from an expansion threshold value $E_{thresh}$, and configuring the first multiplier 512 to multiply the signal by a positive expansion slope value $E_{slope}$. The adder/subtractor 508 and the first multiplier 512 may advantageously be reconfigured programmably so that the compressor logic 510 may serve both the compression and the expansion functions. If the RMS level of the signal falls below the value $E_{thresh}$, expansion is applied to the signal based upon the value $E_{slope}$, which specifies an expander ratio as a ratio of dB.

Figure 10:
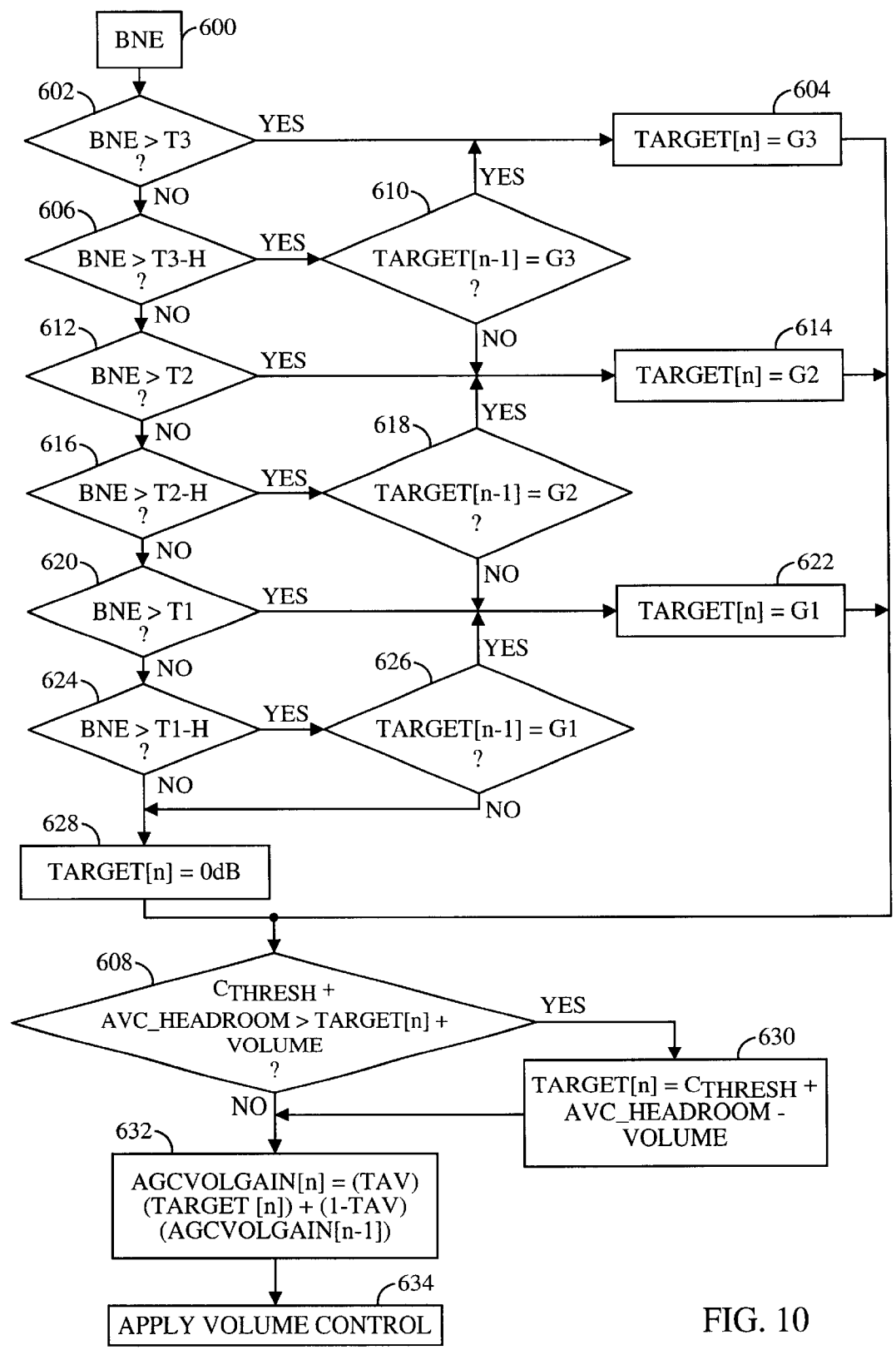
FIG. 10 is a flow chart illustrating steps performed by an automatic volume control (AVC) algorithm.

In accordance with one embodiment, an AVC algorithm performs the steps shown in the flow chart of FIG. 10 in order to track reverse-link environmental conditions and automatically adjust forward-link volume to give the user an appropriate volume level. Advantageously, the user may set a desired volume level setpoint and then, if desired, forget about volume control, which is thereafter handled automatically. The AVC algorithm of FIG. 10 functions in conjunction with the compressor 406 (see FIG. 9), which limits signal levels to a small range above the programmable compression threshold value $C_{thresh}$. The available distortionless headroom is dependent upon the compression threshold value $C_{thresh}$.

In accordance with the flow chart of FIG. 10, the AVC algorithm obtains a background noise estimate (BNE) (a dB value) in step 600. The AVC algorithm then proceeds to step 602. In step 602 the AVC algorithm compares the BNE with a first tunable threshold value T3 (in dB). If the BNE is greater than the first tunable threshold value T3, the AVC algorithm proceeds to step 604. If, on the other hand, the BNE is not greater than the first tunable threshold value T3, the AVC algorithm proceeds to step 606.

In step 604 a volume target value for the current sample, target[n], is set equal to a first predefined gain value G3. The AVC algorithm then proceeds to step 608. In one embodiment the first predefined gain value G3 is set to 18 dB to provide adequate volume for a high-noise environment.

In step 606 the AVC algorithm subtracts a hysteresis value H (in dB) from the first tunable threshold value T3, and compares the resultant difference with the BNE. If the BNE is greater than the difference between the first tunable threshold value T3 and the hysteresis value H, the AVC algorithm proceeds to step 610. If, on the other hand, the BNE is not greater than the difference between the first tunable threshold value T3 and the hysteresis value H, the AVC algorithm proceeds to step 612. The hysteresis value H serves prevent the gain from fluctuating with instantaneous changes in the BNE.

In step 610 the AVC algorithm compares a volume target value for the previous sample, target[n−1], with the first predefined gain value G3. If the volume target value for the previous sample, target[n−1], is equal to the first predefined gain value G3, the AVC algorithm proceeds to step 604. If, on the other hand, the volume target value for the previous sample, target[n−1], is not equal to the first predefined gain value G3, the AVC algorithm proceeds to step 614.

In step 612 the AVC algorithm compares the BNE with a second tunable threshold value T2 (in dB). If the BNE is greater than the second tunable threshold value T2, the AVC algorithm proceeds to step 614. If, on the other hand, the BNE is not greater than the second tunable threshold value T2, the AVC algorithm proceeds to step 616.

In step 614 the volume target value for the current sample, target[n], is set equal to a second predefined gain value G2. The AVC algorithm then proceeds to step 608. In one embodiment the second predefined gain value G2 is set to 12 dB to provide adequate volume for a medium-noise environment.

In step 616 the AVC algorithm subtracts the hysteresis value H from the second tunable threshold value T2, and compares the resultant difference with the BNE. If the BNE is greater than the difference between the second tunable threshold value T2 and the hysteresis value H, the AVC algorithm proceeds to step 618. If, on the other hand, the BNE is not greater than the difference between the second tunable threshold value T2 and the hysteresis value H, the AVC algorithm proceeds to step 620.

In step 618 the AVC algorithm compares the volume target value for the previous sample, target[n−1], with the second predefined gain value G2. If the volume target value for the previous sample, target[n−1], is equal to the second predefined gain value G2, the AVC algorithm proceeds to step 614. If, on the other hand, the volume target value for the previous sample, target[n−1], is not equal to the second predefined gain value G2, the AVC algorithm proceeds to step 622.

In step 620 the AVC algorithm compares the BNE with a third tunable threshold value T1 (in dB). If the BNE is greater than the third tunable threshold value T1, the AVC algorithm proceeds to step 622. If, on the other hand, the BNE is not greater than the third tunable threshold value T1, the AVC algorithm proceeds to step 624.

In step 622 the volume target value for the current sample, target[n], is set equal to a third predefined gain value G1. The AVC algorithm then proceeds to step 608. In one embodiment the third predefined gain value G1 is set to 6 dB to provide adequate volume for a low-noise environment.

In step 624 the AVC algorithm subtracts the hysteresis value H from the third tunable threshold value T1, and compares the resultant difference with the BNE. If the BNE is greater than the difference between the third tunable threshold value T1 and the hysteresis value H, the AVC algorithm proceeds to step 626 If, on the other hand, the BNE is not greater than the difference between the third tunable threshold value T1 and the hysteresis value H, the AVC algorithm proceeds to step 628.

In step 626 the AVC algorithm compares the volume target value for the previous sample, target[n−1], with the third predefined gain value G1. If the volume target value for the previous sample, target[n−1], is equal to the third predefined gain value G1, the AVC algorithm proceeds to step 622. If, on the other hand, the volume target value for the previous sample, target[n−1], is not equal to the third predefined gain value G1, the AVC algorithm proceeds to step 628. In step 628 the volume target value for the current sample, target[n], is set equal to 0 dB, i.e., no gain is applied to the signal. The AVC algorithm then proceeds to step 608.

In step 608 a compression threshold value $C_{thresh}$ is added to a digital headroom control parameter, AVC_Headroom, to produce a first sum. The volume target value for the current sample, target[n], is added to the current volume level to produce a second sum. The first and second sums are compared with each other. If the first sum is greater than the second sum, the AVC algorithm proceeds to step 630. If, on the other hand, the first sum is not greater than the second sum, the AVC algorithm proceeds to step 632.

In step 630 the AVC algorithm adds the compression threshold value $C_{thresh}$ to the digital headroom control parameter, AVC_Headroom, to produce a first sum, and then subtracts the current volume level from the first sum to produce a difference value. The volume target value for the current sample, target[n], is set equal to the volume target value for the difference value. The AVC algorithm then proceeds to step 632. It should be pointed out that the overall gain is limited by 30 the available digital headroom (as provided by a compressor (not shown)) and by the control parameter, AVC_Headroom. The headroom control parameter, AVC_Headroom, is subtracted from the available headroom to limit the total gain available. The absence of digital clipping is ensured because the sum of the compression threshold value $C_{thresh}$, the headroom control parameter, AVC_Headroom, and the current volume level is restricted to a value that is less than 0 dBm0.

In step 632 the product of a time-averaging coefficient TAV and the volume target value for the current sample, target[n], is added to the product of the quantity one minus the time-averaging coefficient TAV and an automatic gain control (AGC) value for the previous sample, AGCVolGain[n−1]. The resultant sum is set equal to an AGC value for the current sample, AGCVolGain[n]. The AVC algorithm then proceeds to step 634. In step 634 the AVC algorithm applies volume control for the current sample.

In the embodiment described with reference to FIG. 10, three tunable threshold values and three predefined gain values were employed. It would be readily apparent to those skilled in the art that any reasonable number of tunable threshold values and predefined gain values could be used. In an alternate embodiment, for example, seven tunable threshold values and seven predefined gain values are used.

In one embodiment, when AVC is activated, the user is provided with setpoints that are defined as the user's preferred volume levels regardless of ambient environmental conditions. Exemplary settings are shown in Table 1, below.

TABLE 1

| Peak Output (dBm0) | Quiet Ambient | Medium Ambient | High Ambient |
|---|---|---|---|
| 0 | | | 6 (high), 7 |
| −3 | | 7 | 5 |
| −6 | | 6 (high) | 4 (medium) |
| −9 = $C_{thresh}$ | 7 | 5 | 3 |
| −12 | 6 (high) | 4 (medium) | 2 (low) |
| −15 | 5 | 3 | 1 |
| −18 | 4 (medium) | 2 (low) | |
| −21 | 3 | 1 | |
| −24 | 2 (low) | | |
| −27 | 1 | | |

In Table 1, the compression threshold value $C_{thresh}$ is set to −9 dBm0, and the volume levels for high, medium, and low user settings are set to 6, 4, and 2, respectively. Volume settings are assumed to be in 3 dB steps starting at 0 dB, i.e., setting 7 is 0 dB, setting 6 is −3 dB, setting 5 is −6 dB, etc. In any setting, when the user is in a high-noise ambient environment, the AVC algorithm provides an additional 12 dB of gain to the signal level. Similarly, in a medium-noise ambient environment, the AVC algorithm provides an additional 6 dB of gain to the signal level. The column describing the quiet-noise ambient environment is equivalent to an AVC OFF mode. It should be understood that any number of setpoints other than three (high, medium, and low) could be used.

In one embodiment AVC logic, such as the AVC logic described above with reference to FIG. 8, is used in conjunction with a variable-rate speech coder, such as the variable-rate CELP coder described in U.S. Pat. No. 5,414,796, which is assigned to the assignee of the present invention and fully incorporated herein by reference. As described above, when the fixed digital gain G is multiplied by the input speech samples, the amplitude of the samples rises. The compression threshold $C_{thresh}$ serves as a smoothing ceiling on the level of the samples. However, for nonspeech (silence) samples, the increased gain renders background noise relatively louder to the user. Hence, the user perceives a lower signal-to-noise ratio (SNR). But the knowledge of the speech coder, which is retained, may be used to determine which frames of samples were encoded/decoded at eighth rate (i.e., which frames were nonspeech frames). Accordingly, to compensate for the relative increase in background noise during periods of silence, each frame that was encoded/decoded at eighth rate is not multiplied by the fixed digital gain G.

Thus, a novel and improved method and apparatus for automatically adjusting microphone and speaker gains within a mobile telephone has been described. Those of skill in the art would understand that the various illustrative logical blocks and algorithm steps described in connection with the embodiments disclosed herein may be implemented or performed with a digital signal processor (DSP), an application specific integrated circuit (ASIC), discrete gate or transistor logic, discrete hardware components such as, e.g., registers and FIFO, a processor executing a set of firmware instructions, or any conventional programmable software module and a processor. The processor may advantageously be a microprocessor, but in the alternative, the processor may be any conventional processor, controller, microcontroller, or state machine. The software module could reside in RAM memory, flash memory, registers, or any other form of writable storage medium known in the art. Those of skill would further appreciate that the data, instructions, commands, information, signals, bits, symbols, and chips that may be referenced throughout the above description are advantageously represented by voltages, currents, electromagnetic waves, magnetic fields or particles, optical fields or particles, or any combination thereof.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. In a mobile telephone, an automatic volume control device, comprising:
   means for generating a microphone gain adjustment of the telephone based upon a detected background noise level in the environment in which the telephone is operated and adapted to select a gain level to compensate for a natural tendency of a user to speak more loudly in noisy environments; and
   a microphone for receiving an acoustic signal having an amplitude and for amplifying the amplitude of the acoustic signal by the selected gain level in accordance with said microphone gain adjustment,
   wherein the microphone gain adjustment is inversely proportional to the detected background noise level,
   wherein when the detected background noise level indicates a noisy environment, the selected gain level reduces the amplitude of the acoustic signal.

2. An apparatus for adjusting the gain of a microphone of a mobile telephone, said apparatus comprising:
   means for detecting the background noise level of the environment in which the mobile telephone is operating; and
   means for setting the gain of the microphone of the mobile telephone based upon the detected background noise levels operated and adapted to select a gain level to compensate for a natural tendency of a user to speak more loudly in noisy environments, wherein the means for setting the gain of the microphone operates to decrease the gain in response to an increase in background noise levels.

3. The apparatus of claim 2 wherein the means for setting the gain of the microphone operates to set the gain to a level inversely proportional to the background noise level.

4. The apparatus of claim 2 further including means for setting the gain of a speaker of the mobile telephone based upon the background noise level.

5. The apparatus of claim 4 wherein the means for setting the gain of the speaker of the mobile telephone operates to increase the gain of the speaker in response to an increase in the background noise level.

6. An apparatus as in claim 2, further comprising:
   means for generating a microphone gain adjustment of the telephone based upon a detected background noise level in the environment in which the telephone is operated; and
   a microphone for receiving an acoustic signal and for amplifying the acoustic signal in accordance with said microphone gain adjustment.

7. An apparatus as in claim 2, further comprising:
   means for setting the gain of the microphone of the mobile telephone based upon the detected background noise levels.

8. The apparatus of claim 7, wherein the means for setting the gain of the microphone operates to decrease the gain in response to an increase in background noise levels.

9. The apparatus of claim 7, wherein the means for setting the gain of the microphone operates to set the gain to a level inversely proportional to the background noise level.

10. The apparatus of claim 7, further including means for setting the gain of a speaker of the mobile telephone based upon the background noise level.

11. The apparatus of claim 10, wherein the means for setting the gain of the speaker of the mobile telephone operates to increase the gain of the speaker in response to an increase in the background noise level.

12. An apparatus as in claim 2, further comprising:
    a microphone gain control unit; and
    an adjustment unit configured to adjust a gain of the microphone using the microphone gain control unit based on a background noise level detected by the background noise level detection unit.

13. The apparatus of claim 12, wherein the adjustment unit operates to decrease the gain in response to an increase in background noise levels.

14. The apparatus of claim 12, wherein the adjustment unit operates to set the gain of the microphone to a level inversely proportional to the background noise level.

15. The apparatus of claim 12, wherein setting the gain of the speaker operates to increase the gain of the speaker in response to an increase in the background noise level.

16. The apparatus of claim 12 wherein the adjustment unit is a digital signal processor.

17. The apparatus of claim 16 wherein the digital signal processor unit includes a microphone gain lookup table.

18. An apparatus for adjusting the gain of a microphone of a mobile telephone, said apparatus comprising:
    a background noise detection unit;
    a microphone gain control unit; and
    an adjustment unit configured to adjust a gain of the microphone using the microphone gain control unit based on a background noise level detected by the background noise level detection unit, and adapted to select a gain level to compensate for a natural tendency of a user to speak more loudly in noisy environments, the selected gain level decreasing in response to an increase in background noise level.

19. The apparatus of claim 18 wherein the adjustment unit operates to decrease the gain in response to an increase in background noise levels.

20. The apparatus of claim 18 wherein the adjustment unit operates to set the gain of the microphone to a level inversely proportional to the background noise level.

21. The apparatus of claim 18 further including
    a speaker; and
    a speaker gain control unit,
    wherein the adjustment unit also is configured to adjust the gain of a speaker of the telephone using the speaker gain control unit based on the detected background noise level.

22. The apparatus of claim 21 wherein the adjustment unit operates to increase the gain of the speaker in response to an increase in the background noise level.

23. The apparatus of claim 18 wherein the adjustment unit is a digital signal processor.

24. The apparatus of claim 23 wherein the digital signal processor unit includes a microphone gain lookup table.

25. A method for use in a mobile telephone comprising the steps of:
    detecting the background noise level of the environment in which the mobile telephone is operating; and setting the gain of a microphone of the mobile telephone based upon the detected background noise levels to compensate for a natural tendency of a user to speak more loudly in noisy environments, wherein setting the gain of the microphone is performed to decrease the gain in response to an increase in background noise levels.

26. The method of claim 25 wherein the step of setting the gain of the microphone is performed to set the gain to a level inversely proportional to the background noise level.

27. The method of claim 25 further including the step of setting the gain of a speaker of the mobile telephone based upon the background noise level.

28. The method of claim 27 wherein the step of setting the gain of the speaker of the mobile telephone is performed to increase the gain in response to an increase in the background noise level.

29. The method as in claim 25, further comprising:
setting the gain of a microphone of the mobile telephone based upon the detected background noise levels.

30. The method of claim 29, wherein the step of setting the gain of the microphone is performed to decrease the gain in response to an increase in background noise levels.

31. The method of claim 29, wherein the step of setting the gain of the microphone is performed to set the gain to a level inversely proportional to the background noise level.

32. The method of claim 29, further including the step of setting the gain of a speaker of the mobile telephone based upon the background noise level.

33. The method of claim 32, wherein the step of setting the gain of the speaker of the mobile telephone is performed to increase the gain in response to an increase in the background noise level.

34. A device for adjusting gain in a microphone of a communications device, comprising:
adjustable digital gain logic coupled to the microphone; and
a limiter coupled to the adjustable digital gain logic, the limiter being configured to perform peak detection on a speech signal that is input to the microphone, wherein the peak detection is calculated as a function of release time and attack time.

35. The device of claim 34, further comprising a noise suppressor coupled to adjustable digital gain logic and to the limiter.

36. The device of claim 34, further comprising analog gain logic coupled to the microphone and an analog-to-digital converter coupled to the analog gain logic.

37. The device of claim 34, wherein the limiter is configured to perform peak detection in accordance with the following equation:

$$x_{peak}[n] = (1-RT)x_{peak}[n-1] + ATx_{diff}[n],$$

wherein $x_{peak}[n]$ is a peak value of a digitized speech sample x[n], RT is a release time value, AT is an attack time value, $x_{peak}[n-1]$ is a peak value of a previous digitized speech sample x[n−1], and $x_{diff}[n]$ is a difference value,
wherein the difference value $x_{diff}[n]$ is equal to the difference between the absolute value of the digitized speech sample x[n] and the peak value x[n−1]) of the previous digitized speech sample x[n−1] if the difference between the absolute value of the digitized speech sample x[n] and the peak value x[n−1] of the previous digitized speech sample x[n−1] is greater than zero, and
wherein the difference value $x_{diff}[n]$ is equal to zero if the difference between the absolute value of the digitized speech sample x[n] and the peak value x[n−1] of the previous digitized speech sample x[n−1] is not greater than zero.

38. A device for adjusting gain in a microphone of a communications device, comprising:
means for applying a digital gain to a signal that is input into the microphone; and
means for limiting the digital gain, the means for limiting being configured to perform peak detection on the signal as a function of release time and attack time.

39. The device of claim 38, further comprising means for suppressing noise and means for digitizing the signal to generate therefrom digitized samples.

40. The device of claim 39, wherein the means for limiting is configured to perform peak detection in accordance with the following equation:

$$x_{peak}[n] = (1-RT)x_{peak}[n-1] + ATx_{diff}[n],$$

wherein $x_{peak}[n]$ is a peak value of a digitized sample x[n], RT is a release time value, AT is an attack time value, $x_{peak}[n-1]$ is a peak value of a previous digitized sample x[n−1], and $x_{diff}[n]$ is a difference value,
wherein the difference value $x_{diff}[n]$ is equal to the difference between the absolute value of the digitized sample x[n] and the peak value x[n−1] of the previous digitized sample x[n−1] if the difference between the absolute value of the digitized sample x[n] and the peak value x[−1] of the previous digitized sample x[n−1] is greater than zero, and
wherein the difference value $x_{diff}[n]$ is equal to zero if the difference between the absolute value of the digitized sample x[n] and the peak value x[n−1] of the previous digitized sample x[n−1] is not greater than zero.

41. A method of adjusting gain in a microphone of a communications device, comprising the steps of:
applying a digital gain to a signal that is input into the microphone; and
limiting the digital gain so as to perform peak detection of the signal as a function of release time and attack time.

42. The method of claim 41, wherein the limiting step comprises the step of performing peak detection on the signal.

43. The method of claim 41, further comprising the steps of suppressing noise and digitizing the signal to generate therefrom digitized samples.

44. The method of claim 43, wherein the limiting step comprises the step of performing peak detection in accordance with the following equation:

$$x_{peak}[n] = (1-RT)x_{peak}[n-1] + ATx_{diff}[n],$$

wherein $x_{peak}[n]$ is a peak value of a digitized sample x[n], RT is a release time value, AT is an attack time value, $x_{peak}[n-1]$ is a peak value of a previous digitized sample x[n−1], and $x_{diff}[n]$ is a difference value,
wherein the difference value $x_{diff}[n]$ is equal to the difference between the absolute value of the digitized sample x[n] and the peak value x[n−1] of the previous digitized sample x[n−1] if the difference between the absolute value of the digitized sample x[n] and the peak value x[n−1] of the previous digitized sample x[n−1] is greater than zero, and
wherein the difference value $x_{diff}[n]$ is equal to zero if the difference between the absolute value of the digitized sample x[n] and the peak value x[n−1] of the previous digitized sample x[n−1] is not greater than zero.

\* \* \* \* \*